US011100215B2

(12) United States Patent
Geraud et al.

(10) Patent No.: US 11,100,215 B2
(45) Date of Patent: Aug. 24, 2021

(54) MANAGEMENT OF A DISPLAY OF A VIEW OF AN APPLICATION ON A SCREEN OF AN ELECTRONIC DATA ENTRY DEVICE, CORRESPONDING METHOD, DEVICE AND COMPUTER PROGRAM PRODUCT

(71) Applicant: INGENICO GROUP, Paris (FR)

(72) Inventors: Remi Geraud, Paris (FR); Hiba Koudoussi, Paris (FR)

(73) Assignee: INGENICO GROUP, Paris (FR)

( * ) Notice: Subject to any disclaimer, the term of this patent is extended or adjusted under 35 U.S.C. 154(b) by 85 days.

(21) Appl. No.: 15/760,101

(22) PCT Filed: Sep. 15, 2016

(86) PCT No.: PCT/EP2016/071897
§ 371 (c)(1),
(2) Date: Mar. 14, 2018

(87) PCT Pub. No.: WO2017/046281
PCT Pub. Date: Mar. 23, 2017

(65) Prior Publication Data
US 2018/0253548 A1 Sep. 6, 2018

(30) Foreign Application Priority Data
Sep. 15, 2015 (FR) ...................... 1558647

(51) Int. Cl.
G06F 21/00 (2013.01)
G06F 21/52 (2013.01)
(Continued)

(52) U.S. Cl.
CPC ............ G06F 21/52 (2013.01); G06F 21/554 (2013.01); G06F 21/84 (2013.01); G06K 9/4604 (2013.01);
(Continued)

(58) Field of Classification Search
CPC .............................. G06F 21/52; G06K 9/4604
(Continued)

(56) References Cited

U.S. PATENT DOCUMENTS 6,657,956 B1 * 12/2003 Sigaud .................... H04L 67/14
370/230
8,935,615 B2 * 1/2015 Grandemenge ......... G06F 21/83
715/743
(Continued)

FOREIGN PATENT DOCUMENTS

WO 2008018055 A2 2/2008
WO 2008114257 A2 9/2008

OTHER PUBLICATIONS

International Preliminary Report on Patentability dated Oct. 26, 2017 for corresponding International Application No. PCT/EP2016/071897, filed Sep. 15, 2016.
(Continued)

*Primary Examiner* — Anthony D Brown
(74) *Attorney, Agent, or Firm* — David. D Brush; Westman, Champlin & Koehler, P.A.

(57) ABSTRACT

A method is provided for managing a display of a view of an application, executed on a non-secured processor of an electronic data entry device that furthermore includes a secured processor. The application delivers at least one current view having a set of pixels to be displayed on a screen of the device. The managing is implemented under the control of the secured processor and includes: analysis of the current view, delivering at least one piece of data representing a presence of at least one suspect pattern; and, when a presence of a suspect pattern is detected within the current view, implementing by the secured processor at least one protection measure.

9 Claims, 2 Drawing Sheets

(51) Int. Cl.
*G06F 21/84* (2013.01)
*G06F 21/55* (2013.01)
*G06K 9/46* (2006.01)

(52) U.S. Cl.
CPC .. *G06F 2221/2143* (2013.01); *G06K 2209/01* (2013.01)

(58) Field of Classification Search
USPC .................................................... 726/22–25
See application file for complete search history.

(56) References Cited

U.S. PATENT DOCUMENTS

| | | | |
|---|---|---|---|
| 2005/0015794 A1* | 1/2005 | Roelens ............. | H04N 21/4147 725/18 |
| 2013/0275306 A1* | 10/2013 | Ignatchenko ...... | G06Q 20/3825 705/44 |
| 2014/0108820 A1 | 4/2014 | Eynon et al. | |
| 2016/0171198 A1* | 6/2016 | John Archibald .... | G06F 21/577 726/19 |

OTHER PUBLICATIONS

International Search Report dated Nov. 10, 2016 for corresponding International Application No. PCT/EP2016/071897, filed Sep. 15, 2016.
Written Opinion of the International Searching Authority dated Nov. 10, 2016 for corresponding International Application No. PCT/EP2016/071897, filed Sep. 15, 2016.

* cited by examiner

MANAGEMENT OF A DISPLAY OF A VIEW OF AN APPLICATION ON A SCREEN OF AN ELECTRONIC DATA ENTRY DEVICE, CORRESPONDING METHOD, DEVICE AND COMPUTER PROGRAM PRODUCT

CROSS-REFERENCE TO RELATED APPLICATIONS

This Application is a Section 371 National Stage Application of International Application No. PCT/EP2016/071897, filed Sep. 15, 2016, which is incorporated by reference in its entirety and published as WO 2017/046281 A1 on Mar. 23, 2017, not in English.

1. FIELD OF THE INVENTION

The field of the invention is that of electronic data entry devices used to carry out operations that bring into play or relate to confidential objects. As an illustration, we may cite payment operations that bring a bankcard number into play or relate to an entry of a confidential code associated with a payment card. The present technique also relates to other operations such as, for example, medical or civil status operations pertaining to an individual's biological or property data.

2. PRIOR ART

Certain electronic data entry devices, such as payment terminals for example, are specifically designed in both hardware and software terms to offer the most optimum possible protection for confidential data likely to be entered therein. This protection against intrusion or attacks can be carried out at several levels. At the level of the physical constitution of the electronic data entry device, its frame can for example consist of an inviolable, tamper-resistant casing or it can be tamper-evident, leaving visible traces of any attempt at tampering, or again it can be tamper-responsive in providing an adapted response to a detection of tampering. The use of electronic circuits that are etched in the mass or multi-layered also offers reinforced security for the device by hugely complicating the task of malicious individuals seeking to intercept confidential data by means of probes placed on certain connections of the device. As for the functional constitution of the device, the sensitive data are generally encrypted and their processing is subjected to cryptographic protocols. Finally, at the software level, it is usually preferred to use components that can be implemented solely in secured processors inaccessible to third parties.

One trade-off to this high level of security is the limited flexibility of use offered by such devices. Obtaining certification for an application so that it can be authorized for use in the secured processor of the device is often a lengthy process burdened with constraints. In a world with a rich variety of electronic equipment such as mobile telephones, personal data assistants and microcomputers, there is a felt need for comparable flexibility in data entry devices, also called secured devices, that are to be used in operations that bring into play or relate to confidential objects. It is known that operating systems commonly known as open operating systems offer an abundance of useful and user-friendly applications that it would be promising for use to meet a need for flexibility in secured devices. Thus, increasingly, secured electronic data entry devices comprise, in addition to the secured processor, an unsecured processor capable of executing third-party applications, for example applications that can be downloaded onto a distribution platform made available by the manufacturer of the device. This opening towards software applications other than strictly secured ones has the drawback of potentially endangering the security of data entered into the secured device. Thus, a malicious application (or an application polluted by malicious execution sequences) could spy upon and betray the security processes of the equipment with a view to retrieving confidential information. A malicious application could also imitate the appearance of a legitimate application (for example a payment application) in order to deceive a user and thus retrieve confidential information.

Thus, while the general public are beginning to get sensitive to the existence of these fraudulent techniques in personal communications terminals (tablets, smartphones, microcomputers, etc.), they does not necessarily have the same level of alertness with more specialist devices (such as payment terminals) which nevertheless are an integral part of their daily lives but which, they take to be secured by the very nature of the operations that are commonly processed therein. Thus, the user tends to trust in these devices more naturally even when the risk of having confidential data stolen is still present.

There is therefore a need to propose electronic data entry devices that comprise means making it possible to prevent or slow down attempts at the fraudulent retrieval of confidential data.

3. SUMMARY OF THE INVENTION

The proposed technique offers a solution that does not have at least some of these problems of the prior art, using an original technique for the management of a display of a view of an application executed on a non-secured processor of an electronic data entry device that furthermore comprises a secured processor. The application considered delivers at least one current view, comprising a set of pixels, to be displayed on a screen of said device. According to a first aspect of the proposed technique, this method for the management of a display of a view is implemented under the control of the secured processor, and it comprises:

a step of analysis of said current view, delivering at least one piece of data representing a presence of at least one suspect pattern;

when a presence of a suspect pattern is detected within said current view, a step of implementation by the secured processor of at least one protection measure.

Thus, the step of analysis enables the identification, within a current view generated by an application being executed on the non-secured processor and intended for display on a screen of an electronic data entry device, of patterns (also called graphic elements) capable of posing a problem of security, for example because they encourage the user of said device to provide sensitive information. The step of implementing protection measures then enables the secured processor to deploy means aimed at preventing the recovery of said sensitive information by this potentially fraudulent application.

In one particular embodiment of the proposed technique, the step of analysis of the current view comprises:

a step of searching, within said set of pixels of said current view, for at least one graphic pattern, delivering a set of recognized patterns; and/or a step of character recognition performed on said current view, delivering or complementing a set of recognized patterns; and a step of searching, within said set of recognized patterns, for at least one suspect pattern.

Thus, the techniques of automated recognition make it possible to set up a true mapping of the current view in order to detect therein words or group of words (character recognition), as well as categories of objects (recognition of images and classification techniques). In this way, these pieces of raw information (raw in the sense that they initially have the form of simple sets of pixels) are translated into textual data more easily exploitable by a computer. These pieces of textual data form a set of recognized patterns, within which it is then possible to search for suspect patterns by different means.

In one particular embodiment of the proposed technique, the step of analysis of the current view is performed subsequently to the display of this current view on the screen of the electronic data entry device.

Thus, the user benefits from the rapid display of the current view on the screen of the electronic data entry device, the analysis of this view being implemented subsequently to its display. The display of the generated view is therefore not delayed by any analysis time that could give rise to latencies, slowdowns or the putting to sleep of the application executed in the non-secured processor.

In another particular embodiment of the proposed technique, the step of analysis of the current view is performed prior to the display of this current view on the screen of the electronic data entry device.

In this way, the secured processor can implement protection measures in relation with a suspect current view even before this suspect view might be displayed on a screen of the electronic data entry device. The step of analysis of the current view is thus for example carried out on a virtual view displayed in a buffer video memory associated with the secured processor rather than directly on the screen of the electronic data entry device. The secured processor can then for example decide to block the display of the suspect view or again to display an expurgated version of the current view from which the suspect patterns have been erased.

In one particular embodiment of the proposed technique, the step of analysis of the current view is implemented by the secured processor of the electronic data entry device.

In this way, the entire method for managing a display of a view can be carried out by the secured processor of the electronic data entry device without having recourse to external resources if any. Thus, this electronic data entry device is independent in implementing the method and it is therefore not dependent on the availability of external resources which, if they were to be lacking, could compromise the security of the electronic data entry device.

In another particular embodiment of the proposed technique, the step of analysis of the current view is implemented by a remote server with which said secured processor is capable of communicating by means of a communications network.

Thus, the step of analysis of the current view can be delegated to an element external to the electronic data entry device which generally has available resources greater than those available within the electronic data entry device. It has for example processors more powerful than the secured processor embedded in the electronic data entry device. In this way, the step of analysis of the current view can be carried out more rapidly or more intensively than if it had been implemented by the secured processor.

In yet another particular embodiment of the proposed technique, the step of analysis of the current view generated by the application executed on the non-secured processor is implemented when one of the following conditions is verified:
said application is absent from a predefined list of trusted applications;
said application is present in this predefined list of trusted applications, and said current view is absent from a list of known views for said application.

In this way, only the views of the unknown applications or the unknown views of a known application are subjected to the step of analysis. Thus, the trustworthy applications (which are for example known applications, the views of which have been preliminarily declared at the level of the secured processor) are not penalized by possible side effects of the implementation of the described method for managing an application. Such side effects can consist for example of slowdowns, latencies or times when the application is put to sleep especially during the time needed to execute the step of analysis of a view (for example because the phase of analysis mobilizes much of the resources of the electronic data entry device or again because the application executed on the processor is deliberately curbed so long as this phase of analysis is not completed).

In one particular embodiment of the proposed technique, said at least one protection measure implemented by the secured processor when the presence of at least one suspect pattern is detected within the current view belongs to the group comprising:
the non-display of said current view on the screen of said electronic data entry device;
the elimination or concealment of at least one part of said current view on the screen of said electronic data entry device;
the non-transmission, to said application, of the data entered by the user in relation with said current view;
the blocking of said application;
the blocking of said electronic data entry device.

Thus, the secured processor has different means available that can be used singly or complementarily to prevent an application being executed in a non-secured processor of an electronic data entry device from retrieving sensitive data about a user. These means rely especially on two main levers of action: on the one hand the elimination of any prompt message or inducement to enter confidential data and, on the other hand, the blocking of the means for entering such data or transmitting this data to the suspect application.

In yet another particular embodiment of the proposed technique, the secured processor intercepts, within a secured memory, any entry made by the user on said electronic data entry device throughout the time of execution of said step of analysis of the current view.

Thus, no data entered by the user is transmitted to the application being executed in the non-secured processor of the electronic data entry device so long as the step of analysis of the current view generated by this application is not terminated. In this way, it is ensured that the data entered by the user of the electronic data entry device is secured, even during the transitional period when the suspect or non-suspect nature of the current view has not yet been established.

In one particular embodiment of the proposed technique, the electronic data entry device is a payment terminal.

According to another aspect, the proposed technique also relates to an electronic data entry device that comprises a non-secured processor and a secured processor and that comprises means for managing a display of a view of an application executed in the non-secured processor, said application delivering at least one current view, comprising a set of pixels to be displayed on a screen of said device. Such an electronic data entry device comprises the following under the control of the secured processor:

means for analyzing said current view, capable of delivering at least one piece of data representing a presence of at least one suspect pattern;

means for implementing at least one protection measure.

According to a preferred implementation, the different steps of the method for managing a display of a view according to the proposed technique are implemented by one or more software programs or computer program comprising software instructions to be executed by a data processor according to the proposed technique, designed to command the execution of different steps of the method.

The invention is therefore also aimed at providing a program capable of being executed by a computer or by a data processor, and especially a secured processor, this program comprising instructions to command the execution of the steps of a method as mentioned here above.

This program can use any programming language whatsoever and be in the form of source code, object code or intermediate code between source code and object code such as in a partially compiled form or in any other desirable form whatsoever.

The invention is also aimed at providing an information carrier readable by a data processor and comprising instructions of a program as mentioned here above.

The information carrier can be any entity or communications terminal whatsoever capable of storing the program. For example, the carrier can comprise a storage means such as a ROM, for example, a CD ROM or a microelectronic circuit ROM or again a magnetic recording means, for example a floppy disk or a hard disk drive.

Furthermore, the information carrier can be a transmissible carrier such as an electrical or optical signal that can be conveyed via an electrical or optical cable, by radio or by other means. The program according to the proposed technique can especially be uploaded to an Internet type network.

As an alternative, the information carrier can be an integrated circuit into which the program is incorporated, the circuit being adapted to executing or to being used in the execution of the method in question.

According to one embodiment, the proposed technique is implemented by means of software and/or hardware components. In this respect, the term "module" can correspond in this document equally well to a software component and to a hardware component or to a set of hardware and software components.

A software component corresponds to one or more computer programs, one or more sub-programs of a program or more generally to any element of a program or a piece of software capable of implementing a function or a set of functions according to what is described here below for the module concerned. Such a software component is executed by a data processor of a physical entity (terminal, server, gateway, router etc) and is capable of accessing hardware resources of this physical entity (memories, recording media, communications buses, input/output electronic boards, user interfaces etc).

In the same way, a hardware component corresponds to any element of a hardware assembly capable of implementing a function or a set of functions according to what is described here below for the module concerned. It can be a programmable hardware component or a component with an integrated processor for the execution of software, for example, an integrated circuit, a smart card, a memory card, an electronic board for the execution of a piece of firmware etc.

Each component of the system described here above implements of course its own software modules.

The different embodiments mentioned here above can be combined with one another to implement the invention.

4. LIST OF FIGURES

Other features and advantages of the invention shall appear more clearly from the following description of a preferred embodiment of the proposed technique, given by way of a simple illustrative and non-exhaustive example and from the appended drawings, of which:

5. DETAILED DESCRIPTION

5.1 General Context

Figure 1:
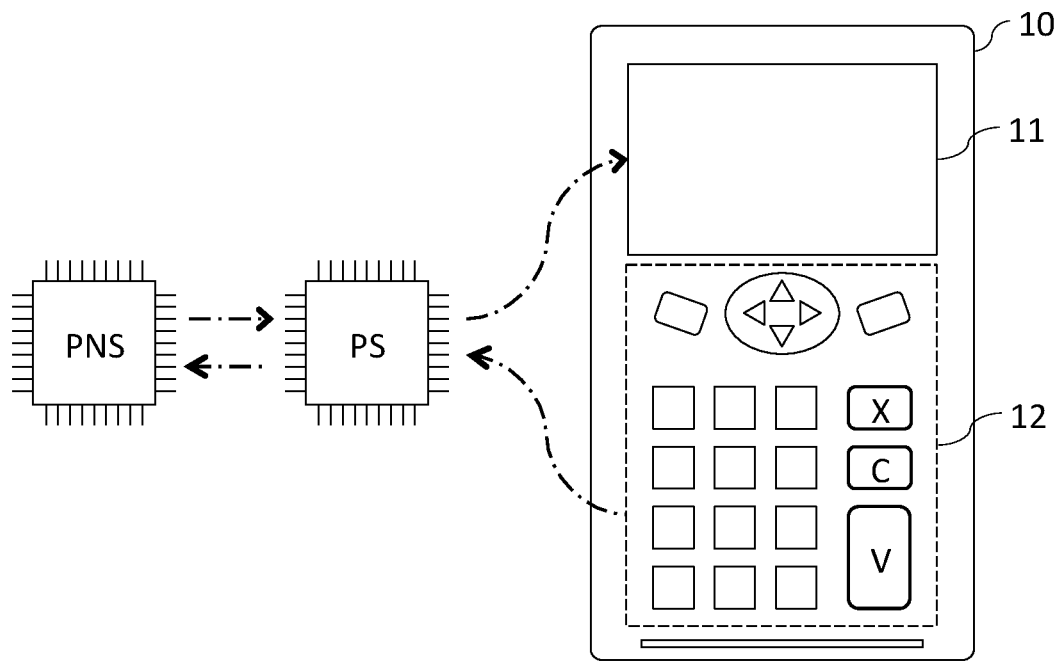
FIG. 1 depicts an example of an electronic data entry device capable of implementing the proposed technique in one embodiment.

The proposed technique can be applied more particularly to electronic data entry devices that comprise two processors, one secured and one non-secured. The secured processor has access to a secured memory and the association of these two elements therefore forms a secured execution environment within the device. The term "secured execution environment" is understood to mean a securing that can equally well be hardware securing or software securing, especially with the implementing of the different protection techniques presented with reference to the prior art (physical constitution of the protective casing for the secured components, electronic circuits etched in the mass or in multilayers, data encryption, etc.). This securing also relies on the use, in the secured processor, of a secured operating system in the sense that it has available a set of means (control means, access restriction means, cryptography means, etc.) supposed to make it less vulnerable and protect it efficiently against the different types of attacks, that it could face. Conversely, the operating system implemented within the non-secured processor of the electronic data entry device is a system that can be qualified as an "open system" in the sense that there is sufficiently widespread access to this system, thus favoring the development of numerous applications. The notion of an open operating system encompasses therefore not only truly open operating systems such as the UNIX and LINUX systems but also widespread, commercially available systems, such as for example the different versions of Microsoft Windows™. The value of these devices—which comprise both a secured processor and a non-secured processor—lies in their capacity to implement not only secured applications, in the sense that these applications have most often been certified by a trusted organization and are authorized for execution by a secured processor, but also third-party applications that are not necessarily certified. These third-party applications, executed by the non-secured processor, are used to enrich the user experience and open the device to new functions. FIG. 1 presents an electronic data entry device (10) of this type such as it exists in the prior art. Such a device (10) most frequently comprises a screen (11) used to display the graphic interface of an application executed within the device and a keypad (12) enabling a user to interact with said application.

In such an electronic data entry device (10), the secured applications are implemented by a secured processor (PS) while the third-party applications, which are not secured, are implemented by a non-secured processor (PNS). The non-secured processor (PNS) is generally placed under the control of the secured processor (PS) in a master-slave type relationship. In particular, any data coming from or addressed to the non-secured processer (PNS) travels through the secured processor (PS). In this context, the secured processor (PS) is especially capable of intercepting any piece of data entered by the user on the keypad (12) of said device even if the entry of this data has been requested by a third-party application executed by the non-secured processor (PNS). In the same way, all the successive views generated by an application being executed on the non-secured processor (PNS) travel through the secured processor (PS). Thus, the secured processor (PS) is capable of carrying out a check on these views, which are intended for display on the screen (11) of the device and which constitute the interface of this application with the user. Among these views, the current view can be defined as a set of pixels that an application seeks, at a given point in time in its execution, to display on the screen of the electronic data entry device. This view can result from a video memorization of a set of objects, for example multimedia objects (text, image). When such an electronic data entry device (10) is used to carry out a secured transaction involving the entry of confidential data (for example a payment operation), the interaction means of the device for interaction with the user (such as the screen (11), the keypad (12), a card reader, etc.) come entirely under the control of the secured processor (PS). The non-secured processor (PNS) is then no longer allowed to interact with these elements, and this ensures a reinforced securing of these sensitive operations because only certified applications executed in the secured processor (PS) are then able to access the exchanged data.

The device presented with reference to FIG. 1, which includes a physical keypad, is given purely by way of a non-exhaustive illustratory example. An electronic data entry device can include a touchscreen as an alternative or as a complement. It also happens that the electronic data entry device includes only one main processor capable of successively fulfilling the role of a secured processor on the one hand, and a non-secured processor on the other hand. In this case, the secured execution environment takes the form of a specific mode of execution of this main processor of the electronic data entry device.

The technique proposed here relates to the prevention and monitoring of attempts at identity theft and information theft by fraudulent applications imitating the visual appearance of legitimate applications. In other words, it seeks to prevent a malicious application, executed on the non-secured processor of an electronic data entry device, from managing to deceive a user by imitating the visual appearance of another application, for example by reproducing the graphic interface of a legitimate and certified payment application conventionally executed on the secured processor of the device. The general principle of the proposed technique therefore consists, on the one hand, in detecting possible phishing attempts linked to a current view generated by an application and, on the other hand, if necessary, in implementing counter-measures to protect the user of the electronic data entry device by preventing the application from receiving potentially confidential data of this user.

5.2 Method

The proposed technique, in the secured processor of an electronic data entry device, implements a check on the views generated by an application executed in the non-secured processor in order to determine whether these views include patterns considered to be suspect. If this is the case, the application is potentially fraudulent and data protection measures therefore need to be applied to protect data that a user might be led to provide in relation with this application. The term "suspect pattern" is understood to mean any graphic interface element (text or images for example) or any combination of such graphic interface elements that could pose a problem of security by prompting the user to provide a piece of sensitive information. A caption or piece of text asking a user to enter a personal identification code is a simple example of a suspect pattern. Other examples will be provided further below in the present document. Implementing the proposed method must therefore enable a securing of the interface presented to the user on the screen of the electronic data entry device in the sense that it prevents a suspect application from retrieving sensitive data of the user. The proposed technique therefore relates to a method for managing a display of a view of an application executed on the non-secured processor of an electronic data entry device.

Figure 2:
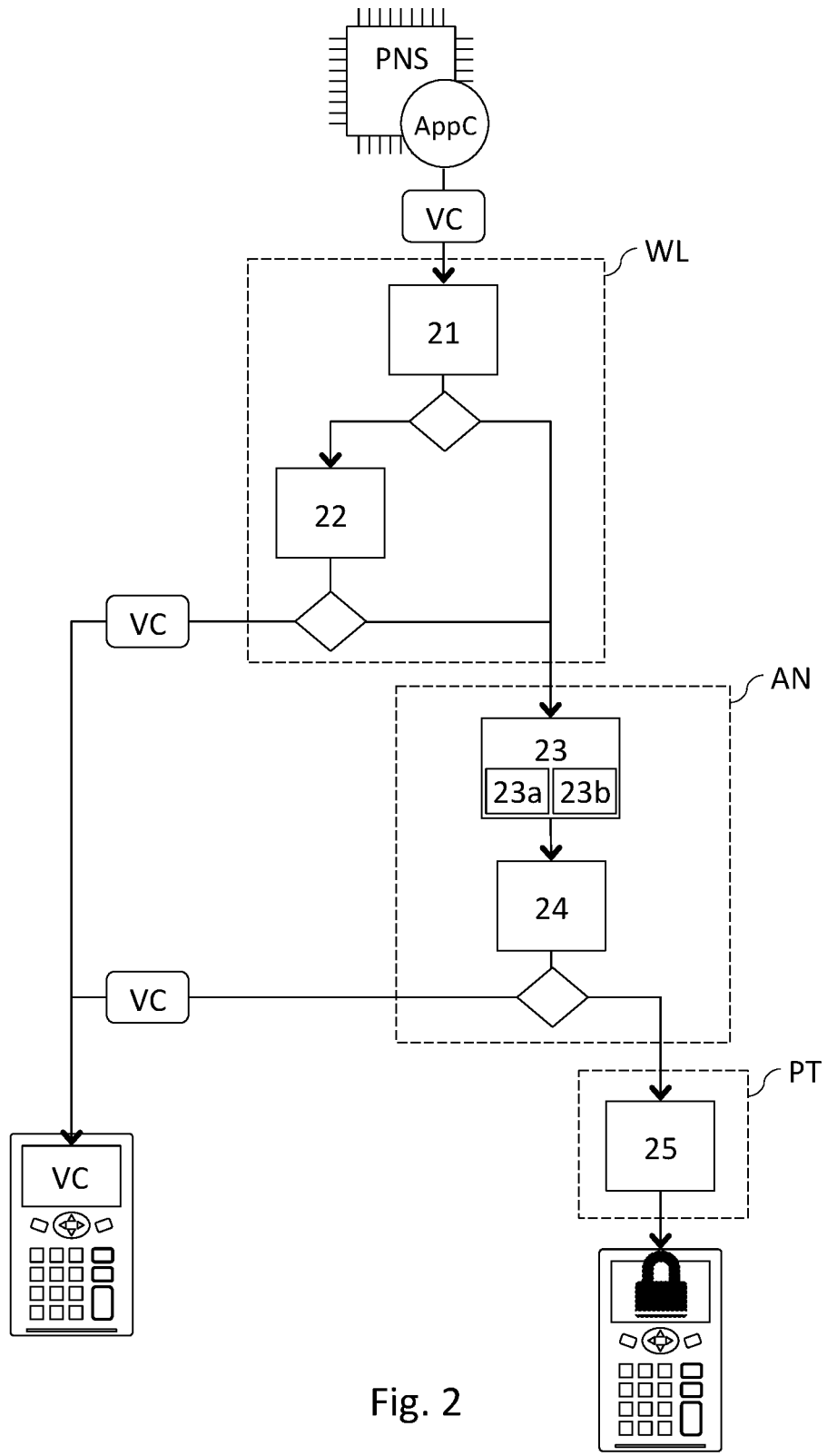
FIG. 2 illustrates the steps implemented under the control of a secured processor of an electronic data entry device to carry out the method for managing a display of a view of an application, according to one particular embodiment of the proposed technique.

Referring to FIG. 2, we describe the steps implemented in the secured processor of an electronic data entry device to carry out the method for managing a display of a view, according to one particular embodiment of the proposed technique. An application (AppC) is being executed within the non-secured processor (PNS) of the electronic data entry device and calls for the display of one of its views, called a current view (VC), on the screen of said device.

The method for managing a display of a proposed view is implemented under the control of the secured processor and it includes two main steps:

a step of analysis (AN) of the current view (VC) delivering at least one piece of data representing a presence of at least one suspect pattern;

when a presence of at least one suspect pattern is detected within said current view (VC), a step of implementation (PT) by the secured processor of at least one protection measure.

The step of analysis (AN) of the current view (VC) is thus aimed at detecting, within this view (VC), at least one suspect pattern liable for example to raise a problem of security by encouraging the user to provide sensitive information while the step of implementing (PT) at least one protection measure is aimed at preventing, if necessary, the retrieval of such a piece of sensitive information by the application (AppC) executed on the non-secured processor of the electronic data entry device.

In the particular embodiment of the proposed technique explained in FIG. 2, an additional step, called a cross-checking step (WL) is carried out prior to the two main steps (AN, PT) already presented. This cross-checking step (WL) which is an optional step is used to cross-check the application (AppC) and then the current view (VC) generated by this application against white lists in order to establish whether the step of analysis (AN) must be implemented for the current view (VC). This mechanism makes it possible to avoid penalizing legitimate and well-known applications by exempting them from the obligation to submit the views that they generate to the phase of analysis (AN), which could lead to latencies, slowdowns or the application (AppC) being put to sleep during the time of execution of this phase of analysis(AN).

Throughout the rest of this document, the step (WL) for cross-checking with the white lists and the two main steps—step of analysis (AN) of the current view and step of implementation (PT) of the protection measures are termed equally well as "steps" or "phases". The term "phase" is especially preferred for the purposes of clarity in order to distinguish these phases from the steps that comprise them.

5.2.1 Phase of Cross-Checking with White Lists (WL)

In one particular embodiment of the proposed technique, the white lists referred to here above with reference to the cross-checking step (WL) can take the form of a data structure such as a database that enumerates and identifies applications known as trusted applications as well as known views associated with each of these trusted applications. Such a database is for example is updated by the manufacturer of the electronic data entry device. In a step of comparison 21 of this phase (WL), a comparison of the application (AppC) with the list of trusted applications is made. This step of comparison 21 can be carried out on the basis of different criteria, for example an application name or identifier. When the application (AppC) is absent from the list of trusted applications, this method routinely carries out the analysis of its views and the phase of analysis (AN) of the current view (VC) is therefore implemented. If, on the contrary, the application (AppC) is present in the list of trusted applications, the current view (VC) is cross-checked, in a comparison step 22, with the list of known views for the trusted application considered. Here too, this step of comparison 22 between a current view and known views can be done on the basis of different criteria, for example on the basis of a view identifier or on the basis of tested techniques of image comparison (colorimetry analysis, spatial analysis, etc.). When the current view (VC) is present in the list of known views for the trusted application considered, this current view is displayed on the screen of the electronic data entry device without any performance of the phase of analysis (AN). In this example, the current view (VC) is indeed considered to be trustworthy and capable of being presented to the user in being displayed on the screen of the electronic data entry device without any need to carry out additional checks. If, on the contrary, the current view (VC) is absent from the list of known views, the phase of analysis (AN) of this current view (VC) is carried out.

It must be noted that other uses of the database enumerating and identifying trusted applications and known views can also be envisaged in other particular embodiments of the proposed technique. For example, this database can serve to detect imitations, i.e. applications imitating the appearance of legitimate applications. Thus, in particular, a given application can be considered to be potentially an imitation of a legitimate application if this application is not part of the list of trusted applications while certain of the views that it generates are similar to views present in the list of known views, for all applications without distinction. If this is the case, the measures for protecting data of the user, described here below with reference to the phase (PT), can then be implemented.

In yet another particular embodiment of the proposed technique, the step of comparison 22 of the current view (VC) with the list of known views for the trusted application considered is not carried out and the sole fact that the application (AppC) is a trusted application is considered to be sufficient to exempt any view generated by this application from the phase of analysis (AN).

5.2.2 Phase of Analysis (AN)

Again with reference to FIG. 2, we present the different steps implemented during the main step of analysis (AN) of the current view (VC) generated by the application (AppC).

In a mapping step 23 for mapping the current view (VC), this current view is subjected to different processing operations in order identify known patterns therein, for example letters of the alphabet that form words or groups of words or again objects that are known and therefore capable of being categorized. Thus, this mapping step 23 for mapping the current view (VC) can especially include a step of character recognition 23a (for example optical character recognition or OCR). As an alternative, or as a complement, this mapping step 23 can also include a step of searching 23b, within the set of pixels that form the current view (VC), for at least one graphic pattern (for example by means of a statistical comparison of an image element with a known glyph). These automated recognition techniques (character recognition techniques and classification techniques) can be used especially to translate images into textual data, more easily exploitable by a computer. Thus, this mapping step 23 enables the extraction from the current view (VC) of a set of recognized patterns constituted for example by representative textual data or else words (or groups of words) present in the current view (VC) or else categories of objects present especially in image form in the current view (VC).

The elements of this set of recognized patterns are then subjected, alone or in combination, to a step of searching 24 for suspect patterns. A suspect pattern is a visual element of the application (in other words a graphic interface element of a current view of the application) that is borrowed from a legitimate application (it has visual similarity) and for example has the specific feature of representing an inducement or prompt sent to a user of the device asking for confidential data.

Taking the example of a payment terminal, the following elements if present within a general current view generated by an application executed on the non-secured processor of the device can be considered to be suspect patterns:

digits spaced out as in a numerical keypad;
a message requesting the user to disclose his personal code ("Enter your PIN code");
the conjunction of elements which, taken in isolation, are not suspect but taken together constitute an attempt at fraud on the part of the application (for example the display, in several parts, of the message "Enter your PIN code").

These examples are given purely by way of a non-exhaustive illustration in the context of a payment terminal and they can be many other examples of suspect patterns especially if we consider other types of electronic data entry devices.

The step of searching 24, within the set of recognized patterns, for suspect patterns can especially be based on the detection of a combination of keywords pertaining for example to the lexical field of data entry ("enter", "key in", "provide information" etc.) or that of confidential data ("PIN", "secret", "code", "personal", "confidential", "password", etc.).

This step of searching 24 is however not limited to simple lexical comparisons, and other more developed, complementary techniques can also be used in other particular embodiments of the proposed technique to determine whether a current view (VC) is suspect. These are for example:

a statistical analysis exploiting learning technologies such as for example Bayesian networks and offering a system of heuristics as regards the legitimacy of the current view (VC) analyzed;

an assessment of the similarity of the application with known legitimate applications (trusted application) measured by comparing the views generated by the application (AppC) with known views associated with these trusted applications.

Depending on their complexity of implementation, the resources that they require and the relevance of the results that they produce, these different techniques can serve to set up different degrees of levels of analysis of a current view. Thus, for example, a low-intensive level of analysis of a current view can consist of a simple unit comparison of the recognized patterns with a pre-established list of keywords, while a higher-intensity level of analysis can consist of an in-depth statistical analysis of the view, using advanced learning technologies. The number of different techniques of analysis implemented for a same view to determine whether it is suspect or not can also constitute an indicator of a level of analysis of said current view. The number of different techniques of analysis is also adapted to the computational power available within the device.

When it is established, following the step of searching 24 for suspect patterns, that the current view (VC) contains no suspect patterns, this current view (VC) is considered to be healthy and it can be presented to the user through a display on the screen of the electronic data entry device.

If, by contrast, the search for suspect patterns made during the searching step 24 proves to be positive (at least one suspect pattern has effectively been detected in the current view), then the current view (VC) is considered to be suspect and the phase (PT) for implementing protection measures can be activated in order to prevent the application (AppC) from obtaining potentially confidential information from the user.

In another particular embodiment of the proposed technique, the level of analysis of the current view (VC) is adapted to characteristics proper to the application (AppC) (different examples of varyingly intensive levels of analysis have already been given here above in the present document). The level of analysis performed can thus for example be less intensive for views generated by a new application from a known developer than for views generated by a totally unknown application from an unknown developer.

In the particular embodiment illustrated in FIG. 2, the phase of analysis (AN) of the current view (VC) is carried out by the secured processor of the electronic data entry device. It can happen however that the secured processor equipping certain electronic data entry devices is not powerful enough to carry out the analysis of the current view (VC) within reasonable time periods (i.e. time periods acceptable to the user that do not excessively impair the user's experience, for example periods of less than a few seconds). Thus, in another particular embodiment of the proposed technique, the phase (AN) for analyzing the current view (VC) is delegated to a remote server with which the electronic data entry device is capable of communicating by means of a communications network. This remote server ideally has resources available that are greater than those available within the electronic data entry device (it has for example processors that are more powerful than the secured processor embedded in the electronic data entry device). In this embodiment, the secured processor transmits the current view (VC) to the remote server which analyzes it. The remote server then returns the results of this analysis, namely a piece of information specifying whether the current view (VC) is considered to be a suspect element or not, to the secured processor.

In another particular embodiment of the proposed technique, the two embodiments explained here above, in relation to the place in which the phase of analysis (AN) of the current view (VC) is conducted, are implemented in such a way as to complement each other: the secured processor carries out for example a first phase of analysis at a surface level in concentrating on a few simple criteria. When this low-intensity phase of analysis reveals the potential presence of suspect patterns, the current view (VC) is transmitted to the remote server so that it can subject the view to a finer and more intensive analysis. In this way, the remote server complements the secured processor when it is necessary to settle a doubt about the potentially suspect nature of the current view (VC).

In addition to being able to act on the level (superficial and/or intensive) of the phase of analysis (AN) and its place of execution (secured processor of the electronic data entry device and/or remote server), it is also possible, in yet other embodiments of the proposed technique, to act on the instant of execution of this analysis phase (AN).

Thus, in one particular embodiment of the proposed technique, the phase of analysis (AN) of the current view (VC) is carried out before the display, if any, of this current view (VC) on a screen of the electronic data entry device. In this embodiment, the current view (VC) generated by the application (AppC) is intercepted by the secured processor of the electronic data entry device and then rendered within a buffer video memory associated with this secured processor (or a remote server to which this analysis is delegated). The mapping step 23 of the phase of analysis (AN) is then carried out on the view rendered within this buffer video memory and not on a real display of this view on a screen of the electronic data entry device.

In another particular embodiment of the proposed technique, the current view (VC) is displayed on the screen of the electronic data entry device and the mapping step 23 is performed directly on the view rendered on the screen of the electronic data entry device.

All these different embodiments can naturally be combined with each other to implement the proposed technique.

5.2.3 Phase of Implementation of the Protection Means (PT)

When it is established, following the phase of analysis (AN), that the current view (VC) is suspect, the phase (PT) for implementing protection measures is triggered in order to prevent the application (AppC) being executed in the non-secured processor (PNS) from obtaining potentially confidential information from the user.

The privileged position of the secured processor—and especially the fact that any piece of data coming from or addressed to the non-secured processor travels through this secured processor—is then used in a step for implementing these protection means (25).

According to different particular embodiments of the proposed technique, two approaches coexist to protect a user's confidential information.

In a first approach, this information is prevented from being entered by the user on the electronic data entry device. This can be done by blocking the means used to enter data into the electronic data entry device (for example, by at least partially blocking the keypad of the device when the application is being executed). Alternatively, another way to prevent the entry of confidential information is to eliminate any prompting to enter information. If the prompts or prompting elements (for example, a message asking for the entry of a confidential code) are never presented to the user (either because the current view that contains them is not displayed on the screen or because the prompts that it contains have been filtered and removed from this view before its display), then the user will have no reason to enter such information.

In a second approach, if a piece of information is already being entered or has already been entered by a user into the electronic data entry device, then this entered data is prevented from being transmitted to the application (AppC). This is done by blocking it at the level of the secured processor.

The approach adopted to implement protection measures can especially differ as a function of the embodiment implemented for the phase of analysis (AN) of the current view (VC). In certain embodiments of the proposed technique, both these approaches can also be implemented in a complementary manner.

Thus, if the phase of analysis (AN) is carried out on a virtual display of the current view (VC), and then rendered in a buffer video memory of the electronic data entry device (or of a remote server), the secured processor can, in one particular embodiment of the proposed technique, prevent the rendering of the current view (VC) on the screen of said device if this view is suspect. In this way, a suspect or fraudulent view is never presented to the user, and this user will not at all be prompted or induced to enter confidential information into the electronic data entry device. As an alternative, only the interface elements liable to prompt the user of the electronic data entry device to enter a piece of confidential data (in other words, only the suspect patterns) can be filtered out—i.e. withdrawn—from the current view (VC) before it is displayed on the screen of said device.

Should the phase of analysis (AN) be carried out directly on the view displayed on the screen of the electronic data entry device and not on a view displayed virtually in the buffer video memory, the secured processor can act on the current view (VC) present on the screen once it has been established that this is a suspect view. The current view can thus for example be totally erased from the screen. As an alternative, only the elements prompting the entry of confidential information (in other words, only suspect patterns) can be erased.

In certain cases, the user has been able to access the current view (VC) because this view has been displayed, even briefly, on the screen of the electronic data entry device. This is for example the case during the execution of the analysis phase (AN) when this phase is carried out directly on the view displayed on the screen of the electronic data entry device. It is also the case if the execution of the method is triggered only when the user makes a data entry related to the current view (VC). Another protection measure can then consist in preventing the transmission, to the application (AppC), of any piece of data entered by the user into the electronic data entry device, by intercepting this data at the secured processor. So long as the analysis of the current view (VC) is not terminated, this data is for example retained in a secured memory associated with the secured processor. Once this analysis is done, if it is established that the current view (VC) is suspect, then the secured processor eliminates the entered data held at this secured memory as well as any new entered data related to the current view (VC). This data which is a user's potentially confidential information, is thus never transmitted to the suspect application (AppC). If, on the contrary, it turns out that the current view (VC) is not suspect, then the data held in the secured memory associated with the secured processor is released and transmitted to the application (AppC) as is any newly entered data related to the current view (VC) displayed on the screen.

These different protection measures, which all constitute particular embodiments of the proposed technique, can be deployed independently of one another or complementarily. As an alternative or in certain serious cases, it is possible that the secured processor will decide to block the application (AppC) in its totality or even the electronic data entry device entirely, for example if this device is deemed to be compromised. In the event of detection of a suspect view, a message intended to warn the user that the application (AppC) is potentially fraudulent can be displayed on the screen of the electronic data entry device in place of the current view (VC) or in place of suspect patterns that have been detected therein.

5.2.4 Implementing the Method

The method for managing a display of a view described here above is implemented under the control of the secured processor of the electronic data entry device, for example by means of an application or a dedicated secured process (different from the application (AppC)) executed within this secured processor, said dedicated secured application or process constantly "listening" as a background task. It is carried out whenever a view is generated by the application (AppC) thus enabling the securing of the entire interface between the user and this application (AppC). The expression "method implemented under the control of the secured processor" is understood to mean that the method can be carried out either integrally by the secured processor or else jointly by the secured processor and at least one element that is external to the electronic data entry device but with which the secured processor alone is qualified to communicate. This external element can for example be a remote server to which the phase (WL) of cross-checking with the white lists and/or the phase (AN) of analysis of the current view (VC) have been delegated.

According to different embodiments of the proposed technique, the execution of the method for managing a display of a view can be triggered at different points in time after a view has been generated by the application (AppC). Thus, the method can for example start as soon as the application (AppC) has generated the current view (VC) and called for its display on a screen of the electronic data entry device but before this display is effectively made. As an alternative, the method can start only once the current view (VC) is displayed on the screen of the device. In yet another particular embodiment of the proposed technique, the method can be implemented not only after the display of the current view (VC) on the screen of the electronic data entry device but also after the user has started making an entry of information linked with this current view (VC) on an entry device (for example a physical keypad or touchscreen) of the electronic data entry device (in this latter case the entered data is held in the secured processor of the electronic data entry device so long as the phase of analysis of the current view (VC) is not terminated).

5.3 Device

The method for managing a display of a previously exposed view is implemented within an electronic data entry device that comprises, in one particular embodiment of the proposed technique, two processors: one secured processor for implementing secured applications and one non-secured processor for implementing third-party non-secured applications (alternatively, and in another particular embodiment of the invention, the electronic data entry device can embed only one main processor capable of successively playing the roles of secured processor and non-secured processor without bringing into question the general principle of the invention).

According to the proposed technique, such a device comprises, in one particular embodiment, means of analysis of a current view generated by an application being executed on the non-secured processor so as to detect at least one pattern therein, called a suspect pattern, which is liable to raise a problem of security by prompting said user to provide a piece of sensitive information. As an alternative, the electronic data entry device can include means of access to external resources (for example a remote server) capable of implementing such an analysis.

According to the proposed technique, the electronic data entry device also comprises means of implementing protection measures aimed at preventing the retrieval of such sensitive information by the application, if the phase of analysis of the current view has established the fact that it contains suspect patterns.

Figure 3:
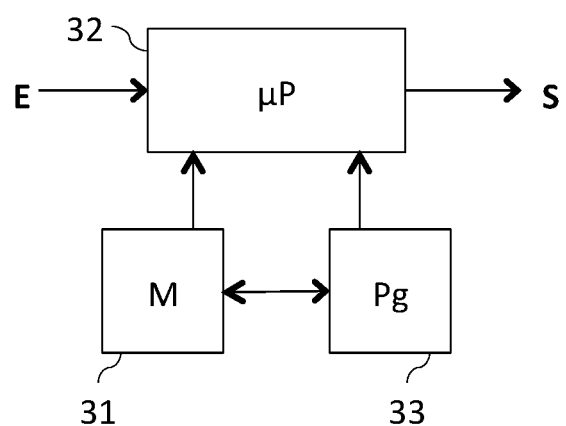
FIG. 3 depicts a simplified architecture of a secured environment of execution comprising a secured processor, within which the method for managing a display of a view of an application can be implemented, according to one particular embodiment of the proposed technique.

The method of management of a display of a view is more particularly implemented under the control of the secured processor of the electronic data entry device in a secured execution environment such as the one presented with reference to FIG. 3.

For example, the secured execution environment comprises a secured memory (31) constituted by a buffer memory, a processing unit (32) equipped for example with the secured processor and driven by the secured computer program (33) implementing the steps needed to manage a display of a view of an application executed on the non-secured processor according to the proposed technique.

At initialization, the code instructions of the computer program (33) are for example loaded into a memory and then executed by the secured processor of the processing unit (32). The processing unit (32) inputs (E) for example a view (in other words a set of pixels) generated by an application being executed on the non-secured processor of the electronic data entry device, a view for which said application calls for a display on a screen of said device. The secured processor of the processing unit (32) then implements the steps of the method for managing a display of a view, according to the instructions of the computer program (33) and, at output (S), it notifies possible protection measures to be applied to prevent the retrieval of sensitive information by said application, if this application proves to be potentially fraudulent.

To this end, the secured execution environment comprises, in addition to the secured memory (31), means of data transmission/reception that make it possible, on the one hand, to exchange data coming from the entry device (for example a keypad) and addressed to a rendering device (for example a screen) of the electronic data entry device and, on the other hand, to exchange data with a non-secured processor of the electronic data entry device. Thus, the secured execution environment is especially capable of intercepting the data coming from or addressed to an application executed on the non-secured processor of the electronic data entry device. These data transmission/reception means can take the form of software or hardware connection interfaces. According to the proposed technique, such a secured execution environment furthermore comprises storage means that can take the form of a database or a set of configuration files, or an access to such storage means. These storage means can especially host a predetermined list of applications enumerating and identifying the applications to which additional trust is assigned and which are not to be penalized by an analysis phase. For each of these trusted applications, these storage means also host a list of known views that serves as a basis of comparison to determine whether the view generated by an application is considered to be trustworthy (in which case the view is not analyzed) or not trustworthy (in which case even if the application is known, the view is analyzed, in one particular embodiment of the proposed technique). These lists of applications and reference views are for example updated by the manufacturer of the electronic data entry device. In certain particular embodiments of the proposed technique, the secured execution environment also comprises means of data transmission/reception that can take the form of a hardware connection to one or more communications networks, these means making it possible if necessary to set up a secured link with at least one remote server in charge of carrying out the analysis of the views generated by an application executed by the non-secured processor, when this analysis is not carried out within the electronic data entry device itself. The cross-checking of the application and of the generated views with the white lists can also, in certain particular embodiments of the proposed technique, be delegated to an external element external to the electronic data entry device such as a remote server. These connection interfaces can take the form of software interfaces or hardware interfaces (of the network card type or network communications hardware module type). Finally, in certain particular embodiments of the proposed technique, the secured execution environment can also include a secured buffer video memory within which a view generated by the application can be rendered, prior to a real display, if any, on a screen of the electronic data entry device.

In one particular embodiment of the proposed technique, the electronic data entry device is a payment terminal.

The invention claimed is:
1. A method comprising:
managing a display of a view of an application, said application being executed on a non-secured processor of an electronic data entry device that furthermore comprises a secured processor, said application delivering at least one current view, comprising a set of pixels, to be displayed on a screen of said device, wherein the managing comprises, under the control of said secured processor:
analysis of said current view, delivering at least one piece of data representing a presence of at least one suspect pattern within said current view, said suspect pattern being a graphic interface element or a combination of graphic interface elements prompting a user of the electronic data entry device to provide a piece of sensitive information, said analysis being implemented by a remote server with which said secured processor is capable of communicating by using a communications network and/or implemented by said secured processor of the electronic data entry device;
intercepting, within a secured memory, by the secured processor, any entry made by the user on the electronic data entry device throughout the time of execution of said analysis of the current view; and
when a presence of at least one suspect pattern is detected within said current view, implementing by the secured processor at least one protection measure.

2. The method according to claim 1 wherein the analysis comprises the following acts:
at least one of:
searching, within said set of pixels of said current view, for at least one graphic pattern, delivering a set of recognized patterns; and/or
performing character recognition on said current view, delivering or complementing a set of recognized patterns; and
searching, within said set of recognized patterns, for at least one suspect pattern.

3. The method according to claim 1 wherein the analysis is performed subsequently to the electronic data entry device displaying said current view on said screen of said device.

4. The method according to claim 1 wherein the analysis is performed on a view rendered in a buffer video memory prior to the electronic data entry device displaying said current view on said screen of said device.

5. The method according to claim 1 wherein the analysis of the current view is implemented when one of the following conditions is verified:
said application is absent from a predefined list of trusted applications;
said application is present in said predefined list of trusted applications, and said current view is absent from a list of known views for said application.

6. The method according to claim 1, wherein said at least one protection measure, implemented by the secured processor when the presence of at least one suspect pattern is detected within the current view, belongs to the group consisting of:
non-display of said current view on the screen of said electronic data entry device;
elimination or concealment of at least one part of said current view on the screen of said electronic data entry device;
non-transmission, to said application, of data entered by the user in relation with said current view;
blocking of said application;
blocking of said electronic data entry device.

7. The method according to claim 1 wherein said electronic data entry device is a payment terminal.

8. An electronic data entry device comprising:
a screen;
a non-secured processor and a secured processor;
a non-transitory computer-readable medium comprising instructions stored thereon, which when executed by the secured processor configure the secured processor to manage a display of a view of an application executed on the non-secured processor, said application delivering at least one current view, comprising a set of pixels to be displayed on the screen of said device, wherein managing the display comprises the following acts under the control of the secured processor:
analyzing said current view and/or means for communication with a remote server capable of analyzing said current view, and delivering at least one piece of data representing a presence of at least one suspect pattern within said current view, said suspect pattern being a graphic interface element or a combination of graphic interface elements prompting a user of the electronic data entry device to provide a piece of sensitive information;
intercepting, within a secured memory, by the secured processor, any entry made b the user on the electronic data entry device throughout the time of execution of said analysis of the current view; and
implementing at least one protection measure by using the secured processor when a presence of at least one suspect pattern is detected within said current view.

9. A non-transitory computer readable medium comprising a computer program product stored thereon comprising program code instructions for executing a method for managing a display of a view of an application when the instructions are executed by a secured processor of an electronic data entry device, said application being executed on a non-secured processor of the electronic data entry device, said application delivering at least one current view, comprising a set of pixels, to be displayed on a screen of said device, wherein the managing comprises, under the control of said secured processor:
analysis of said current view, delivering at least one piece of data representing a presence of at least one suspect pattern within said current view, said suspect pattern being a graphic interface element or a combination of graphic interface elements prompting a user of the electronic data entry device to provide a piece of sensitive information, said analysis being implemented by a remote server with which said secured processor is capable of communicating by using a communications network and/or implemented by said secured processor of the electronic data entry device;
intercepting, within a secured memory by the secured processor, any entry made by the user on the electronic data entry device throughout the time of execution of said analysis of the current view; and
when a presence of at least one suspect pattern is detected within said current view, implementing by the secured processor at least one protection measure.

* * * * *